United States Patent
Honma et al.

(10) Patent No.: US 10,364,888 B2
(45) Date of Patent: *Jul. 30, 2019

(54) CONTROL DEVICE FOR CONTINUOUSLY VARIABLE TRANSMISSION

(71) Applicants: JATCO Ltd, Fuji-shi, Shizuoka (JP); NISSAN MOTOR CO., LTD., Yokohama-shi, Kanagawa (JP)

(72) Inventors: Tomoaki Honma, Isehara (JP); Yuta Suzuki, Sagamihara (JP); Itaru Shinohara, Atsugi (JP); Hiroshi Sekiya, Atsugi (JP); Hiromu Ogino, Yamato (JP)

(73) Assignees: JATCO LTD, Fuji-Shi (JP); NISSAN MOTOR CO., LTD., Yokohama-Shi (JP)

( * ) Notice: Subject to any disclaimer, the term of this patent is extended or adjusted under 35 U.S.C. 154(b) by 82 days.

This patent is subject to a terminal disclaimer.

(21) Appl. No.: 15/324,897

(22) PCT Filed: May 28, 2015

(86) PCT No.: PCT/JP2015/065330
§ 371 (c)(1),
(2) Date: Jan. 9, 2017

(87) PCT Pub. No.: WO2016/006356
PCT Pub. Date: Jan. 14, 2016

(65) Prior Publication Data
US 2017/0204970 A1    Jul. 20, 2017

(30) Foreign Application Priority Data
Jul. 9, 2014 (JP) .................................. 2014-141741

(51) Int. Cl.
*F16H 59/68* (2006.01)
*F16H 61/02* (2006.01)
(Continued)

(52) U.S. Cl.
CPC ......... *F16H 61/66272* (2013.01); *F16H 9/16* (2013.01); *F16H 59/44* (2013.01);
(Continued)

(58) Field of Classification Search
CPC ........................ F16H 2059/683; F16H 61/0021
See application file for complete search history.

(56) References Cited

U.S. PATENT DOCUMENTS 4,779,417 A * 10/1988 Kita .................... F16H 61/4026
60/430
4,962,678 A    10/1990 Murano et al.
(Continued)

FOREIGN PATENT DOCUMENTS

JP    05-126238 A    5/1993
JP    2000-213638 A    8/2000
(Continued)

OTHER PUBLICATIONS

U.S. Office Action dated Aug. 8, 2017 as issued in corresponding U.S. Appl. No. 15/324,880.
(Continued)

Primary Examiner — Tisha D Lewis
(74) Attorney, Agent, or Firm — Foley & Lardner LLP

(57) ABSTRACT

A control device for a continuously variable transmission includes: a line pressure generating-section configured to generate a line pressure; a pilot valve configured to supply a pilot pressure regulated so as not to exceed a first predetermined pressure when the line pressure exceeds the first predetermined pressure; a control section configured to generate the clamping forces by controlling the pilot pres-
(Continued)

sure; a line pressure increase section configured to increase the line pressure to be greater than the first predetermined pressure when the control to increase the line pressure is performed when the line pressure is lower than the first predetermined pressure.

10 Claims, 5 Drawing Sheets

(51) Int. Cl.
　　*F16H 61/662*　　(2006.01)
　　*F16H 59/54*　　(2006.01)
　　*F16H 61/00*　　(2006.01)
　　*F16H 9/16*　　(2006.01)
　　*F16H 59/44*　　(2006.01)
　　*F16H 59/48*　　(2006.01)

(52) U.S. Cl.
　　CPC .............. *F16H 59/48* (2013.01); *F16H 59/54* (2013.01); *F16H 61/0021* (2013.01); *F16H 61/662* (2013.01); *F16H 2061/66277* (2013.01); *F16H 2312/18* (2013.01)

(56) References Cited

U.S. PATENT DOCUMENTS

| | | | |
|---|---|---|---|
| 5,031,481 A * | 7/1991 | Algrain | F16H 61/66259 474/28 |
| 5,157,992 A * | 10/1992 | Hayashi | F16H 61/66254 474/28 |
| 5,249,483 A | 10/1993 | Iizuka | |
| 5,598,335 A | 1/1997 | You | |
| 5,782,718 A * | 7/1998 | Wakahara | F16H 61/0021 477/169 |
| 7,558,660 B2 | 7/2009 | Izumi et al. | |
| 8,287,431 B2 | 10/2012 | Kobayashi et al. | |
| 9,939,063 B2 * | 4/2018 | Honma | F16H 61/0021 |
| 2001/0039470 A1 | 11/2001 | Fessler | |
| 2009/0234546 A1 | 9/2009 | Inoue et al. | |
| 2011/0048552 A1 | 3/2011 | Dohi et al. | |
| 2013/0136623 A1 | 5/2013 | Hwang et al. | |
| 2016/0356380 A1 * | 12/2016 | Hashimoto | F16H 61/66272 |

FOREIGN PATENT DOCUMENTS

| | | |
|---|---|---|
| JP | 2002-227984 A | 8/2002 |
| JP | 2005-003065 A | 1/2005 |
| JP | 2008-089146 A | 4/2008 |
| JP | 2012-219947 A | 11/2012 |
| JP | 2013-113437 A | 6/2013 |

OTHER PUBLICATIONS

U.S. Appl. No. 15/324,885, filed Jan. 9, 2017, Honma et al.
U.S. Appl. No. 15/324,880, filed Jan. 9, 2017, Honma et al.
U.S. Notice of Allowance dated Dec. 7, 2017 issued in co-pending U.S. Appl. No. 15/324,880.
U.S. Non-Final Office Action dated Jun. 29, 2018 issued in co-pending U.S. Appl. No. 15/324,885.
U.S. Notice of Allowance dated Nov. 30, 2018 issued in co-pending U.S. Appl. No. 15/324,885.

* cited by examiner (a)

(b)

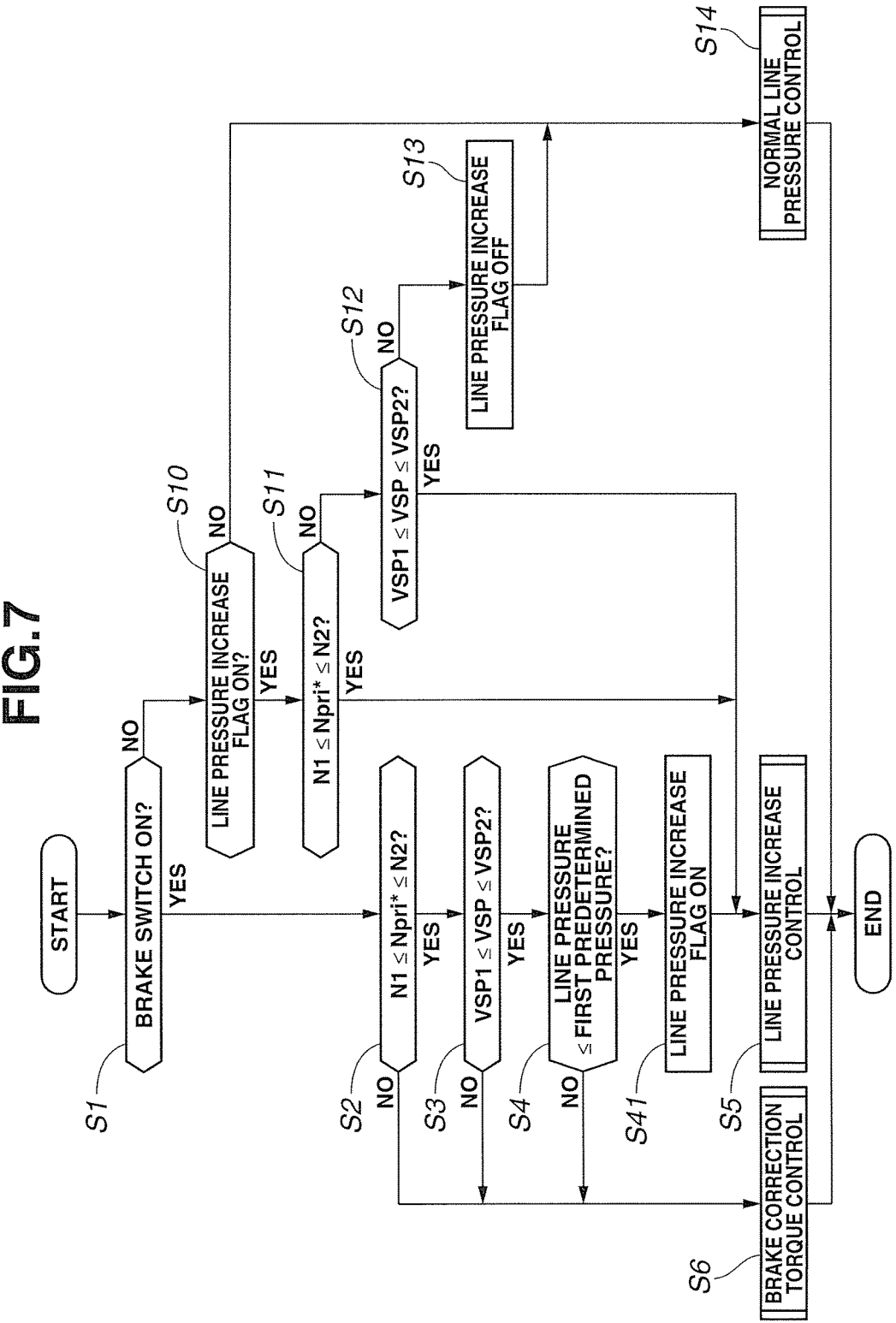

CONTROL DEVICE FOR CONTINUOUSLY VARIABLE TRANSMISSION

TECHNICAL FIELD

This invention relates to a control device for a continuously variable transmission mounted on a vehicle.

BACKGROUND ART

In a belt type continuously variable transmission, when a foot brake switch (hereinafter, referred to as a brake switch) is brought to an ON state by a depression of a brake pedal, a braking torque is transmitted from driving wheels to the continuously variable transmission, so that a belt slippage may be generated. A patent document 1 discloses an art to prevent the belt slippage by increasing a belt clamping force of the continuously variable transmission when the brake switch is brought to the ON state.

In recent years, a hydraulic control of the transmission is often performed in a state where a line pressure is set to a low value, for improving fuel economy. In a case where the brake switch becomes the ON state when a vehicle travels in a state where the line pressure is lower than a pilot pressure that is a source pressure of a signal pressure for (of) various hydraulic actuators, an oil vibration may be generated due to the increase of the belt clamping force. That is, in a case where the belt clamping force is increased in a rage where the line pressure is lower than the pilot pressure, the vehicle behavior is varied due to the oil vibration even when the belt slippage.

PRIOR ART DOCUMENT

Patent Document

Patent Document 1: Japanese Patent Application Publication No. 2008-89146

SUMMARY OF THE INVENTION

It is an object to provide a control device for a continuously variable transmission devised to solve the above-mentioned problems, and to suppress the variation of the vehicle behavior, and to suppress the unnatural feeling to the driver.

For attaining the above-described objects, in this present invention, in a continuously variable transmission which includes a belt wound around a primary pulley and a secondary pulley, and which is shifted by controlling belt clamping forces of the primary pulley and the secondary pulley, there are provided a line pressure generating means configured to generate a line pressure; a pilot valve configured to supply a pilot pressure regulated so as not to exceed a first predetermined pressure when the line pressure exceeds the first predetermined pressure; a control means configured to generate the clamping forces by controlling the pilot pressure; and a line pressure increase means configured to increase the line pressure to be greater than the first predetermined pressure when the control to increase the line pressure is performed when the line pressure is lower than the first predetermined pressure.

When the control to increase the hydraulic pressure is performed when the line pressure is lower than the first predetermined pressure which is the pilot pressure, the oil vibration may be generated due to the hydraulic pressure increase command. In this case, the line pressure is controlled to be greater than the first predetermined pressure. Accordingly, the pilot valve excludes the excessive hydraulic pressure of the varying line pressure. It is possible to stably supply first predetermined pressure. Consequently, the clamping force is generated based on the stable pilot pressure. Therefore, it is possible to decrease the variation of the control hydraulic pressure according to the oil vibration. Accordingly, it is possible to prevent the mutual increase within the hydraulic circuit.

BRIEF DESCRIPTION OF DRAWINGS

FIG. 7 is a flow chart showing a line pressure increase control in the first embodiment.

DESCRIPTION OF EMBODIMENTS

Figure 1:
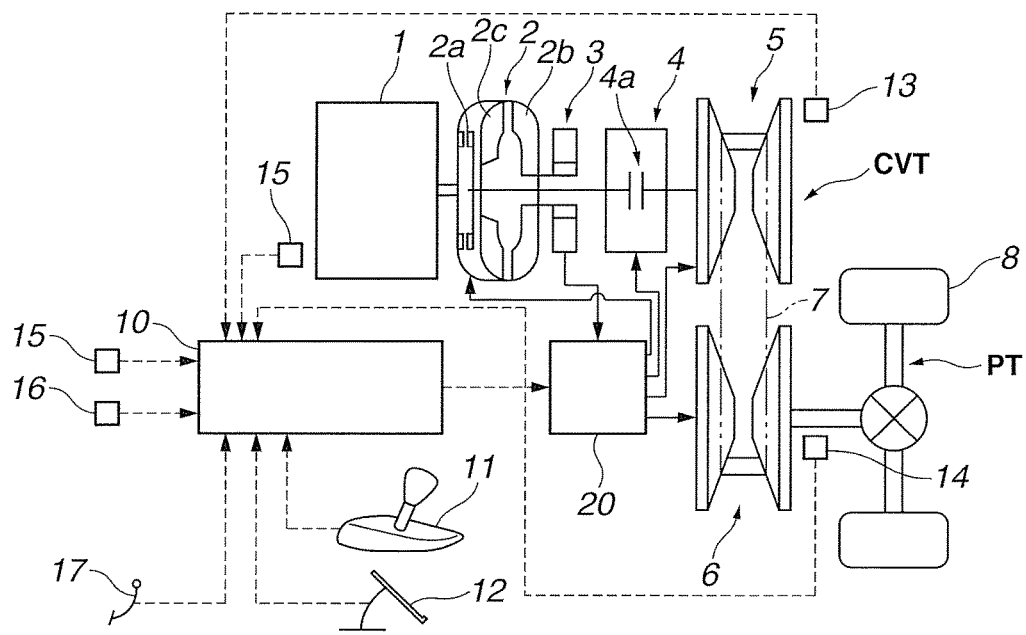
FIG. 1 is a system diagram showing a control device of a continuously variable transmission according to a first embodiment.

FIG. 1 is a system diagram showing a control device of a continuously variable transmission according to a first embodiment. A vehicle according to the first embodiment includes an engine 1 which is an internal combustion engine, and the continuously variable transmission. A driving force is transmitted through a differential gear to tires 8 which are driving wheels. A power transmitting path connected from a belt type continuously variable transmission mechanism CVT to the tires 8 is referred to as a power train PT.

The continuously variable transmission includes a torque converter 2, an oil pump 3, and a forward/rearward movement switching mechanism 4, and the belt type continuously variable transmission mechanism CVT. The torque converter 2 includes a pump impeller 2b connected to the engine 1, and arranged to rotate as a unit with a driving claw configured to drive the oil pump 3; a turbine runner 2c connected to an input side of the forward/rearward movement switching mechanism 4 (an input shaft of the belt type continuously variable transmission mechanism CVT); and a lock-up clutch 2a arranged to integrally connect the pump impeller 2b and the turbine runner 2c. The forward/rearward movement switching mechanism 4 includes a planetary gear mechanism, and a plurality of clutches 4a. The forward/rearward movement switching mechanism 4 is arranged to switch the forward movement and the rearward movement in accordance with the engagement state of the clutch 4a. The belt type continuously variable transmission mechanism CVT includes a primary pulley 5 connected to an output side of the forward/rearward movement switching mechanism 4 (an input shaft of the continuously variable transmission); a secondary pulley 6 arranged to rotate as a unit with driving wheels; a belt 7 wound around the primary pulley 5 and the secondary pulley 6 to transmit the power; and a control valve unit 20 arranged to supply control pressures to hydraulic actuators.

A control unit 10 receives a range position signal (hereinafter, the range position signal is described as a P range, an R range, an N range, or a D range) from a shift lever 11 which is arranged to select a range position by an operation of a driver, an accelerator pedal opening degree signal (hereinafter, APO) from an accelerator pedal opening degree sensor 12, a brake pedal ON/OFF signal from a brake switch 17, a primary pulley pressure signal from a primary pulley pressure sensor 15 arranged to sense a hydraulic pressure of the primary pulley 5, a secondary pulley pressure signal from a secondary pulley pressure sensor 16 arranged to sense a pressure of the primary pulley 6, a primary pulley rotation speed signal Npri from a primary pulley rotation speed sensor 13 arranged to sense a rotation speed of a primary pulley 5, a secondary pulley rotation speed signal Nsec from a secondary pulley rotation speed sensor 14 arranged to sense a rotation speed of the secondary pulley 6, and an engine speed Ne from an engine speed sensor 15 arranged to sense an engine speed. Besides, the primary pulley rotation speed signal Npri is identical to the turbine rotation speed by the engagement of the clutch 4a in a case of the D range. Accordingly, hereinafter, the primary rotation speed signal Npri is also described as the turbine rotation speed Nt.

The control unit 10 controls the engagement state of the clutch 4a in accordance with the range position signal. That is, the control unit 10 is configured to control the clutch 4a to the disengagement state in case of the P range or the N range. The control unit 10 is configured to output a control signal to the control valve unit 20 in case of the R range so that the forward/rearward movement switching mechanism 4 outputs the reverse rotation, and thereby to engage the rearward clutch (or the brake). Moreover, the control unit 10 is arranged to output a control signal to the control valve unit 20 in case of the D range so that the forward/reverse movement switching mechanism 4 rotates as a unit to output the positive rotation, and thereby to engage the forward clutch 4a. Furthermore, the control unit 10 calculates a vehicle speed VSP based on the secondary rotation speed Nsec.

A shift map to attain an appropriate fuel economy state in accordance with a traveling state is set within the control unit 10. A target transmission gear ratio (corresponding to a predetermined transmission gear ratio) is set based on the APO signal and the vehicle speed VSP based on this shift map. It is controlled by the feed forward control based on the target transmission gear ratio. The actual transmission gear ratio is sensed based on the primary pulley rotation speed signal Npri and the secondary pulley rotation speed signal Nsec. The feedback control is performed so that the set target transmission gear ratio and the actual transmission gear ratio become identical to (corresponds to) each other. That is, the target primary rotation speed Npri* is calculated from the current vehicle speed VSP and the target transmission gear ratio. The transmission gear ratio is controlled so that the turbine rotation speed Nt (the engine speed at the engagement of the lock-up clutch 2a) becomes the target primary rotation speed Npri*. Moreover, the hydraulic pressure commands of the pulleys and the engagement pressure command of the lock-up clutch 2a are outputted to the control valve unit 20 by the feedback control, so that the hydraulic pressures of the pulleys and the lock-up pressure difference of the lock-up clutch 2a are controlled. Besides, in the first embodiment, a line pressure sensor is not provided within the control valve unit 20. When the line pressure is sensed, the line pressure is sensed from the command signal to a line pressure solenoid valve 30 (described later). However, the line pressure sensor may be provided to sense the line pressure.

The control unit 10 performs a brake correction torque control to increase the hydraulic pressure supplied to the secondary pulley 6 when the brake switch 17 is brought to the ON state. In the normal forward traveling state, the secondary pulley pressure which is a minimum clamping pressure for preventing the belt slippage is supplied for improving the fuel economy. In this case, when the braking torque is actuated to the driving wheels by the depression of the driver, the torque in a direction which is different from those of the driving wheels is inputted to the secondary pulley 6. The belt slippage is easy to be generated. Accordingly, when the brake switch 17 is brought to the ON state, the brake correction torque control to increase the secondary pulley pressure is performed. The brake correction torque control is a control to increase the clamping force by increasing the hydraulic pressure supplied to the secondary pulley 6 (the increase of the hydraulic pressure is largely increased as the previously set deceleration is larger) in accordance with the inertia torque calculated based on the transmission gear ratio when the brake switch 17 is brought to the ON state, the previously set deceleration, and the engagement state of the lock-up clutch. The line pressure, and the hydraulic pressure supplied to the primary pulley 5 is increased in accordance with this hydraulic pressure supplied to the secondary pulley 6. When the brake switch 17 is brought to the OFF state, the brake correction torque control is finished, so that the hydraulic pressure supplied to the secondary pulley 6 is decreased and returned to the normal clamping pressure.

Figure 2:
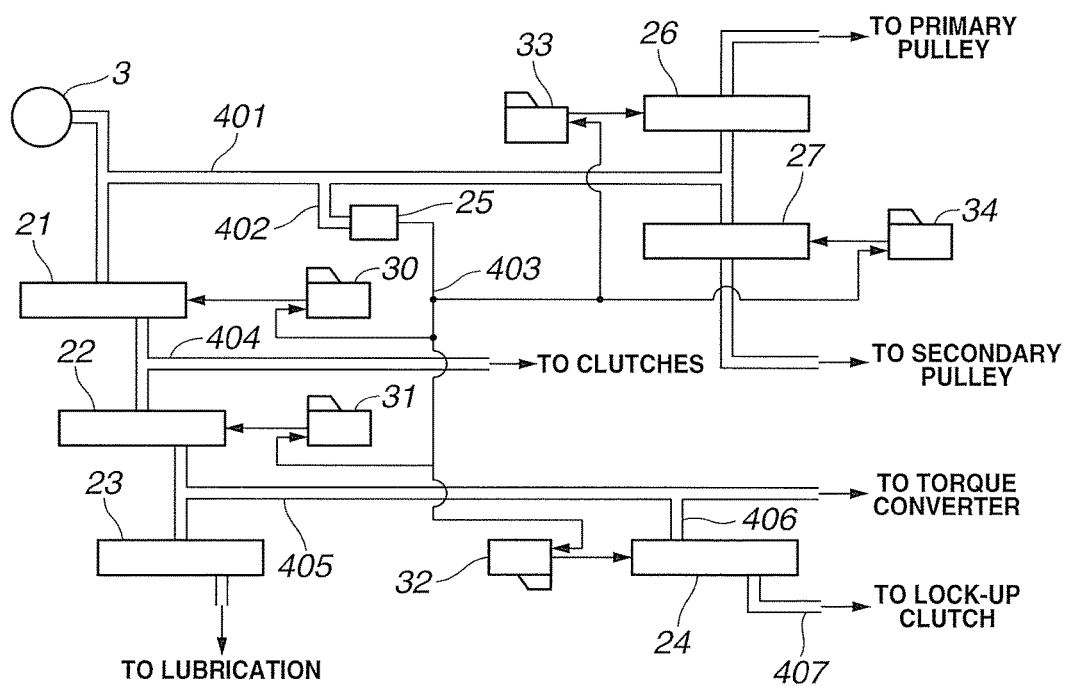
FIG. 2 is a hydraulic circuit diagram showing an outline (skeleton) within a control valve unit according to the first embodiment.

FIG. 2 is a hydraulic circuit diagram showing an outline within the control valve unit in the first embodiment. The pump pressure discharged from the oil pump 3 driven by the engine 1 is discharged to the hydraulic passage 401, and regulated to the line pressure by the pressure regulator valve 21. The hydraulic passage 401 is supplied, as the source pressures for the pulley hydraulic pressure, to the pulleys. A primary regulator valve 26 is connected to the hydraulic passage 401, and that pressure is regulated to the primary pulley pressure by the primary regulator valve 26. Similarly, a secondary regulator valve 27 is connected to the hydraulic passage 401, and that pressure is regulated to the secondary pulley pressure by the secondary regulator valve 27. A pilot valve 25 is provided in a hydraulic passage 402 bifurcated from the hydraulic passage 401. The pilot valve 25 generates a previously set first predetermined pressure (corresponding to a predetermined pressure in claim 1) from the line pressure, and outputs the first predetermined pressure to the pilot pressure hydraulic passage 403. With this, the source pressure of the signal pressures outputted from the solenoid valves (described later) are generated. Besides, when the line pressure is equal to or smaller than the first predetermined pressure, the line pressure and the pilot pressure are outputted as the same pressure.

The hydraulic passage 404 is connected to the pressure regulator valve 21, and that pressure is regulated to the engagement pressure of the clutch 4a by the clutch regulator valve 22. The hydraulic passage 405 is connected to a torque converter regulator valve 23, and that pressure is regulated to the converter pressure of the torque converter 2 by the torque converter regulator valve 23. The hydraulic passage 406 bifurcated from the hydraulic passage 405 is connected to a lock-up valve 24, and that pressure is regulated to the lock-up pressure of the lock-up clutch 2a by the lock-up valve 24. In the lock-up clutch 2a, the lock-up control is performed by the lock-up pressure difference which is a pressure difference between the converter pressure and the lock-up pressure. In this way, the clutch regulator valve 22 is provided on the downstream side of the pressure regulator valve 21. The torque converter regulator valve 23 is provided on the more downstream side. With this, even when the excessively large torque is inputted from the engine, the belt slippage of the belt type continuously variable transmission CVT is prevented by the slippage of the lock-up clutch 2a and the slippage of the clutch 4a.

The pilot pressure hydraulic passage 403 includes a line pressure solenoid valve 30 configured to control the line pressure; a clutch pressure solenoid valve 31 configured to control the clutch engagement pressure; a lock-up solenoid valve 32 configured to control the lock-up pressure; a primary solenoid valve 33 configured to control the primary pulley pressure; and a secondary solenoid valve 34 configured to control the secondary pulley pressure. The solenoid valves control the energization states of the solenoids based on the control signal outputted from the control unit 10 to supply the signal pressure by using the pilot pressure as the source pressure to the valves, so as to control the pressure regulation states of the valves.

In this case, problems when the oil vibration is generated within the control valve unit 20 are explained. As described above, various valves are provided within the control valve unit 20. The pressure regulator valve 21 is a valve arranged to regulate the highest hydraulic pressure discharged from the oil pump 3. Accordingly, the pressure regulator valve 21 is easy to receive the influence of the pump pulsation. A spool and so on constituting the pressure regulator valve 21 is vibrated in accordance with design specifications of valve diameter, an inertia, and so on, so that the line pressure may be vibrated (hereinafter, described as oil vibration). The line pressure may be (is often) varied in a stepped manner from the low line pressure, for increasing the secondary pulley pressure in accordance with the brake correction torque control. In this case, the oil vibration may be (is often) generated due to the sudden variation of this line pressure. Moreover, the line pressure is set in accordance with the accelerator pedal opening degree APO. Accordingly, the line pressure is set to the low value when the accelerator pedal opening degree APO is small. The line pressure is set to the large value when the accelerator pedal opening degree APO is large.

Figure 3:
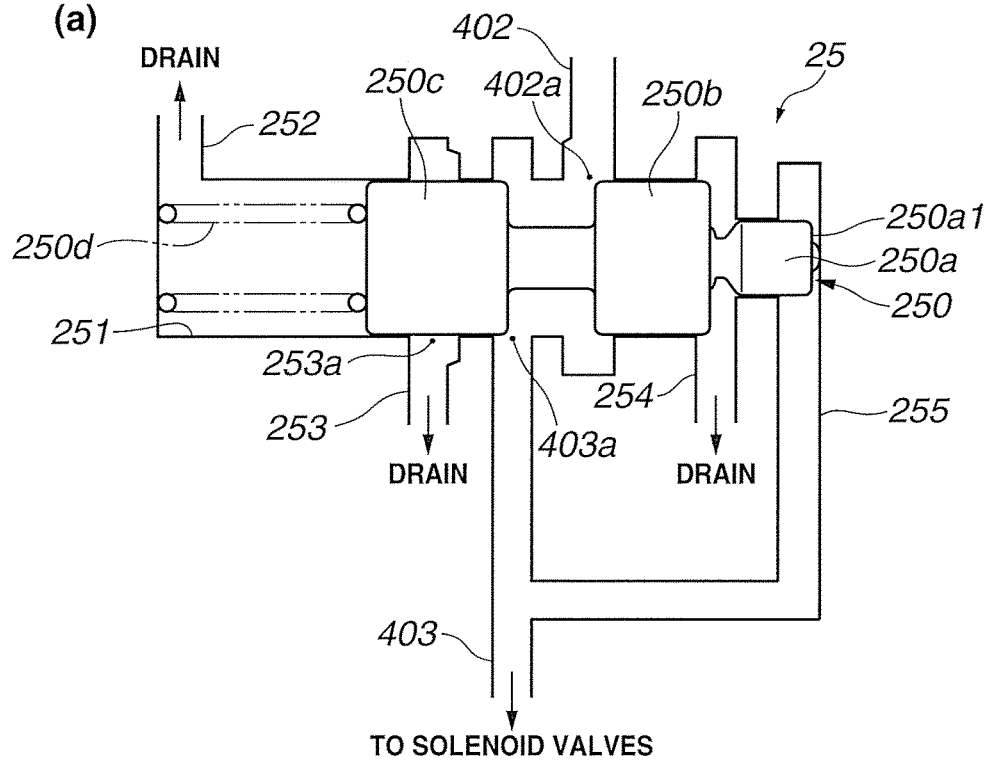
FIG. 3 are schematic views showing a construction of a pilot valve in the first embodiment.
Figure 3:
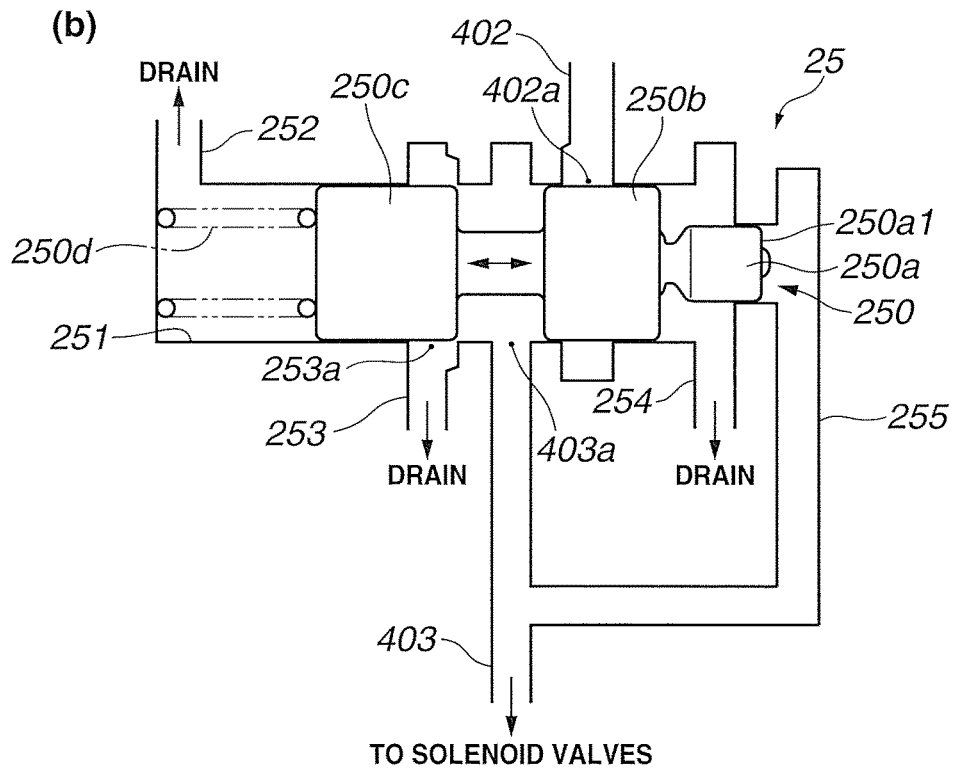

FIG. 3 are schematic views showing a structure of the pilot valve in the first embodiment. FIG. 3(a) shows an initial state before the generation of the hydraulic pressure. FIG. 3(b) shows a state when the pilot pressure is regulated. The components are illustrated by using the position relationship shown in FIG. 3(a). The pilot valve 25 includes a valve receiving hole 251 formed within the control valve unit; a spool valve 250 received within the valve receiving hole 251; and a spring 250d arranged to urge the spool valve 250 in one direction. The spool valve 250 includes a first spool 250a including a feedback pressure land portion 250a1 arranged to receive the hydraulic pressure supplied from a pilot pressure feedback circuit 255; a second spool 250b arranged to regulate an opening degree of the line pressure port 402a; and a third spool 250c arranged to regulate connection states with the pilot pressure port 403a and the drain port 253a.

The spring 250d is received between a bottom surface of the valve receiving hole 251 and the third spool 250c. The spring 250d urges on the pilot pressure feedback circuit 255's side. The spring 250d urges the spool valve 250 by the previously set predetermined spring set load. A drain circuit 252 is connected to the valve receiving hole 251 in which this spring 250d is received. Moreover, a drain circuit 254 is connected to a portion between the first spool 250a and the second spool 250b. When the spool valve 250 is moved, the drain circuit 254 allows a volume variation of a space between the second spool 250b and the valve receiving hole 251. In this way, the drain circuits are connected to the both sides of the spool valve 250. With this, it is possible to ensure the smooth operation of the spool valve 250.

When the line pressure is smaller than the first predetermined pressure which is the pilot pressure maximum value, it does not overcome the predetermined spring set load of the spring 250d, so that the spool valve 250 is not actuated. In this case, the hydraulic pressure is directly supplied from the line pressure port 402a to the pilot pressure port 403a. Consequently, the line pressure and the pilot pressure are the same. Next, when the line pressure is equal to or greater than the first predetermined pressure which is the pilot pressure maximum value, the spool valve 250 is started to be actuated as shown in FIG. 3(b). That is, the force generated by acting the hydraulic pressure of the pilot pressure feedback circuit 255 to the feedback pressure land portion 250a1 becomes greater than the predetermined spring set load. With this, the spool valve 250 is moved in the leftward direction of FIG. 3 (the spring 250d's side). With this, the opening of the line pressure port 402a becomes narrow by the second spool 250b. The line pressure is decreased by the orifice effect. The hydraulic pressure supplied to the pilot pressure feedback circuit 255 is also lowered. Moreover, when the line pressure is extremely high, the pilot pressure port 403a and the drain port 253a are connected by the movement of the third spool 250c. The line pressure supplied so that it becomes the pilot pressure is largely decreased from the drain circuit 253. In this way, the spool valve 250 is actuated by the pilot pressure supplied from the feedback circuit 255, so that the pilot pressure is regulated so as to have the first predetermined pressure which is the maximum value.

Figure 4:
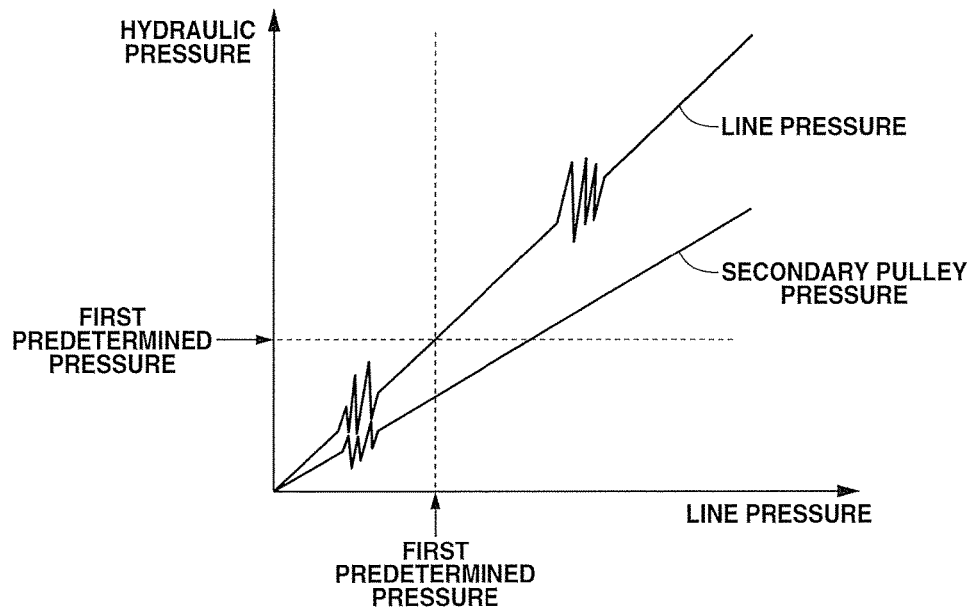
FIG. 4 is a characteristic view showing a relationship among a line pressure, a pilot pressure, and a secondary pulley pressure in the continuously variable transmission according to the first embodiment.

FIG. 4 is a characteristic view showing a relationship among the line pressure, the pilot pressure, and the secondary pulley pressure in the continuously variable transmission according to the first embodiment. A lateral axis represents the line pressure. A longitudinal axis represents the hydraulic pressure. The line pressure becomes liner relationship. As illustrated in the hydraulic circuit structure of FIG. 3, the pilot pressure is a hydraulic pressure regulated based on the line pressure. The secondary pulley pressure is a hydraulic pressure regulated based on the line pressure. In a region in which the line pressure is greater than the first predetermined pressure, the line pressure>the pilot pressure is satisfied. Even when the oil vibration is generated in the line pressure, the small influence is acted to the pilot pressure. The signal pressure outputted from the secondary solenoid valve 34 is difficult to receive the influence. Accordingly, there are few elements vibrated within the control valve. Consequently, the oil vibration is not increased due to the mutual interference within the control valve.

On the other hand, in a region where the line pressure is equal to or smaller than the first predetermined pressure, the line pressure=the pilot pressure is satisfied. At this time, when the oil vibration is generated in the line pressure, the pilot pressure is also vibrated. Moreover, the secondary solenoid valve 34 arranged to regulate the line pressure to the secondary pulley pressure receives the influence of the vibrated pilot pressure. Accordingly, the signal pressure discharged from the secondary regulator valve 27 is influenced by the vibration of the pilot pressure. When the secondary pulley pressure is controlled, the influence of the oil vibration is received. In this way, when the oil vibration is generated in the region where the line pressure is equal to or smaller than the first predetermined pressure, the elements which are vibrated within the control valve are increased. Consequently, the oil vibration is increased by the mutual interference (interaction) within the control valve.

Figure 5:
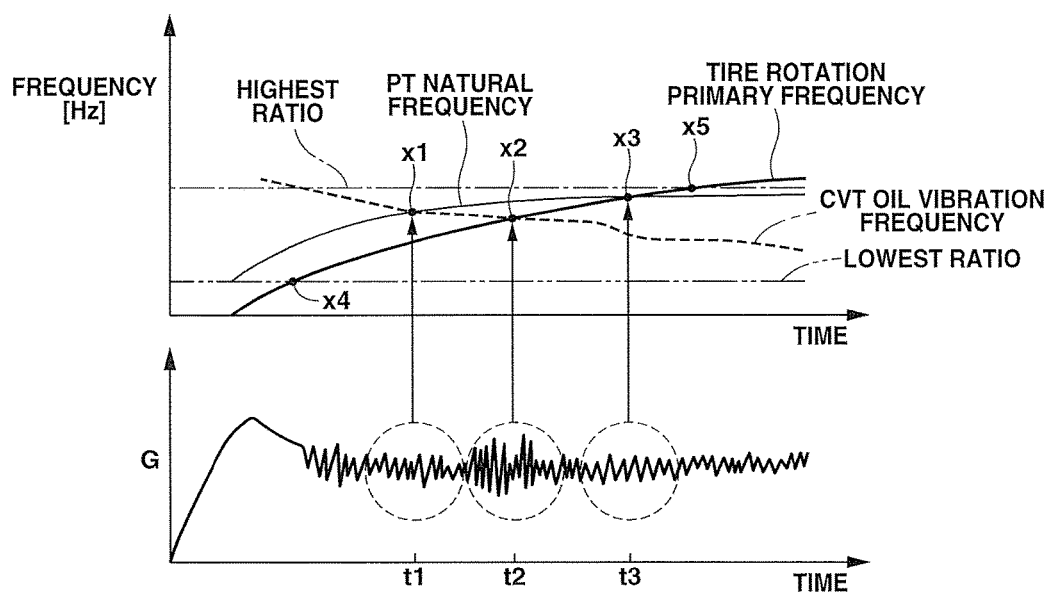
FIG. 5 is a time chart in a case where an oil vibration is generated when a vehicle travels in a state where the line pressure is lower than a first predetermined pressure.

FIG. 5 is a time chart when the oil vibration is generated when the vehicle travels in a state where the line pressure is smaller than the first predetermined pressure. In FIG. 5, a bold solid line is a tire rotation primary vibration frequency. A thin solid line is a natural frequency of the power train PT. A bold dotted line is an oil vibration frequency. One dot chain line is a natural frequency of the power train PT when the belt type continuously variable transmission CVT is the highest ratio. Two dot chain line is a natural frequency of the power train PT when the belt type continuously variable transmission CVT is the lowest ratio. In this case, the tire rotation primary frequency represents a primary frequency of the rotation vibration which is generated when the tires 8 are rotated, and which is easy to be felt by the occupant. Moreover, the natural frequency of the power train PT represents an elastic torsion natural frequency which the power train PT transmits the power through a shaft and so on to the tires 8. Besides, this natural frequency is varied to the high frequency side when the belt type continuously variable transmission mechanism CVT is the High side, and varied to the low frequency side when the belt type continuously variable transmission mechanism CVT is the Low side.

As shown in FIG. 5, the vibration of the line pressure influences the pilot pressure. The oil vibration frequency (for example, the line pressure frequency) within the control valve, and the tire rotation primary frequency and the natural frequency of the power train PT may be resonated. With this, the forward/rearward acceleration vibration of the vehicle may be increased. Therefore, in this first embodiment, the line pressure is increased when the brake switch 17 is in the ON state, when the line pressure is equal to or smaller than the first predetermined pressure, and when the resonance of the various vibrations may be generated.

As shown in FIG. 5, a point of intersection of the oil vibration frequency of the line pressure (represented by the CVT oil vibration frequency in FIG. 5) and the natural frequency of the power train PT is represented by x1 (a second traveling state). A point of intersection of the oil vibration frequency and the tire rotation primary frequency is represented by x2 (a first traveling state). A point of intersection of the natural frequency of the power train PT and the tire rotation primary frequency is represented by x3 (a third traveling state). A point of intersection of the tire rotation primary frequency and the Lowest rate natural frequency is represented by x4. A point of intersection of the tire rotation primary frequency and the Highest rate natural frequency is x5. Besides, these frequencies are determined by their design specifications (design specification of the pressure regulator valve, the pump characteristics, design specification of the power train PT, tire diameter, and so on).

As shown in the vibration state of the forward/rearward acceleration G of FIG. 5, when the vehicle is started and gradually accelerated, the transmission gear ratio of the belt type continuously variable transmission mechanism CVT is upshifted from the Lowest side to the Highest side based on the vehicle speed VSP and the accelerator opening degree APO. The natural frequency of the power train PT is increased in accordance with this upshift. The tire rotation primary frequency is also increased in accordance with the increase of the vehicle speed VSP. Then, the forward/rearward acceleration G is vibrated by the influence of the oil vibration.

At time t1, the natural frequency of the power train PT and the oil vibration frequency are easy to be resonated near the intersection point x1. The forward/rearward accelerator vibration is easy to be generated.

Moreover, at time t2, the tire rotation primary frequency and the oil vibration frequency are easy to be resonated near the intersection point t2. Furthermore, these are near the natural frequency of the power train PT. Accordingly, these and the natural frequency of the power train PT are easy to be resonated.

Moreover, at time t3, the tire rotation frequency and the natural frequency of the power train PT are easy to be generated at the intersection point x3. By this influence, the tire rotation primary frequency and the natural frequency of the power train PT may be resonated with the oil vibration frequency.

Figure 6:
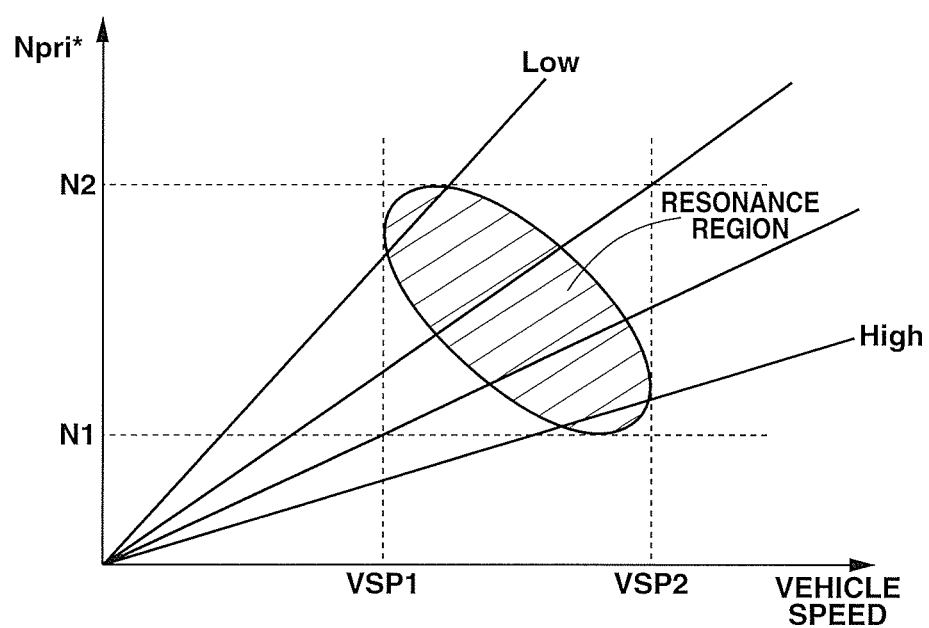
FIG. 6 is a characteristic view showing a region in which a natural frequency of a power train PT and a tire rotation primary frequency are resonated when the oil vibration is generated in a state where the line pressure is lower than the first predetermined pressure.

FIG. 6 is a characteristic view showing a region in which the natural frequency of the power train PT and the tire rotation primary frequency are resonated when the oil vibration is generated in a state where the line pressure is smaller than the first predetermined pressure. It has been discovered that the resonance region near the intersection point x1 and the intersection point x2 exist in a region where the vehicle speed VSP is defined from VSP1 to VSP2, and in a region where the target primary rotation speed Npri* is defined from N1 to N2.

Accordingly, this traveling state which has the intersection point x1, x2 and x3, and which induces the resonance is specified by the regions of the target primary rotation speed Npri* and the vehicle speed VSP. The line pressure is increased to the predetermined pressure greater than the first predetermined pressure, when the brake switch 17 is the ON state in the region of the above-described target primary rotation speed Npri* and the above-described vehicle speed VSP. With this, even when the oil vibration is generated in the line pressure due to the brake correction torque control in a case where the secondary pulley pressure is increased by the brake correction torque control, the line pressure becomes higher than the first predetermined pressure. Accordingly, it is possible to exclude the increase of the oil vibration due to the mutual interference within the control valve, and to suppress the resonance with the other vibration components. Besides, when the traveling state is determined based on the target primary rotation speed Npri* and the vehicle speed VSP, it may be determined, for example, by the traveling state including the intersection points x4 and x5. The intersection points x4 and x5 can be determined by the design specifications. The intersection points x4 and x5 can cover the entire region in which the natural frequency of the power train PT and the tire natural primary frequency may be resonated. This is because the region including these intersection points x4 and x5 causes the resonance due to the relationship between the oil vibration frequency, and the natural frequency of the power train PT and the tire rotation primary frequency.

FIG. 7 is a flowchart showing the line pressure increase control in the first embodiment.

At step S1, it is judged whether or not the brake switch 17 is in the ON state. When the ON state is judged, the process proceeds to step S2. Otherwise, the process proceeds to step S10.

At step S2, it is judged whether or not the target primary rotation speed Npri* is within the predetermined rotation speed range (N1≤Npri*≤N2). When the target primary rotation speed Npri* is within the predetermined rotation speed, the process proceeds to step S3. Otherwise, the process proceeds to step S6. At step S6, the brake correction torque control to increase the hydraulic pressure supplied to the secondary pulley 6 is performed. This is predetermined rotation speed range is set based on the traveling state in which the above-described intersection points x1, x2, and x3 are included. Besides, by using the target primary rotation speed Npri*, it is possible to previously grasp the resonance range, and to attain the line pressure increase control with the higher response.

At step S3, it is judged whether or not the vehicle speed VSP is within the predetermined vehicle speed range (VSP1≤VSP≤VSP2). When the vehicle speed VSP is within the predetermined vehicle speed range, the process proceeds to step S4. Otherwise, the process proceeds to step S6. At step S6, the brake correction torque control to increase the hydraulic pressure supplied to the secondary pulley 6 is performed. This predetermined vehicle speed range is set based on the traveling state in which the above-described intersection points x1, x2, and x3 are included.

At step S4, it is judged whether or not the line pressure is equal to or smaller than the first predetermined pressure. When the line pressure is equal to or smaller than the first predetermined pressure, the process proceeds to step S5. At step S5, the line pressure increase control is performed. When the line pressure is greater than the first predetermined pressure, the process proceeds to step S6. At step S6, the brake correction torque control to increase the hydraulic pressure supplied to the secondary pulley 6 is performed. Besides, a value obtained by subtracting a pressure obtained in consideration of safety factor from the first predetermined pressure may be used in place of the first predetermined pressure. The first predetermined pressure is not limited to these. Besides, the first predetermined pressure is previously determined by the design specifications of the pilot valve 25. The line pressure can be sensed from the command signal to the line pressure solenoid 30. Accordingly, it is judged whether or not the line pressure is equal to or smaller than the predetermined pressure, by comparing the current command signal to the line pressure solenoid 30, and the predetermined stored value corresponding to the first predetermined pressure. Besides, in a case where the line pressure sensor and so on which is arranged to sense the lie pressure, these can be compared by using the line pressure sensor signal.

At step S41, the line pressure increase flag is set to the ON state.

At step S5, the line pressure increase control is performed. At this time, the brake correction torque control to increase the secondary pulley pressure is performed. That is, the second predetermined pressure which is greater than the first predetermined pressure, and the target line pressure set by the brake correction torque control are compared. Then, the line pressure is set to the hydraulic pressure of higher one of the above-comparison (select high). This second predetermined pressure is the value obtained by adding the third predetermined pressure obtained in consideration of the amplitude of the oil vibration which is previously obtained by the experiment and so on. With this, it is possible to further exclude the influence of the oil vibration to the pilot pressure, and to suppress the energy consumption without extremely increasing the line pressure. Moreover, the second predetermined pressure may be the first predetermined pressure. Furthermore, the amplitude of the line pressure is sensed. The second predetermined pressure may be set in accordance with this amplitude of the line pressure. For example, a minimum value of oscillating (vibrating) line pressure is sensed. The second predetermined pressure is set so that this minimum value becomes smaller than the first predetermined pressure. When the secondary pulley pressure is increased in this state, it is possible to increase the clamping force of the secondary pulley 6 in a state where the influence of the oil vibration is excluded, and to stably ensure the vehicle behavior and so on.

At step S10, it is judged whether or not the line pressure increase flag is in the ON state. When the line pressure increase flag is in the ON state, the process proceeds to step S11. When the line pressure increase flag is in the OFF state, the process proceeds to step S6. At step S6, the brake correction torque control to increase the hydraulic pressure supplied to the secondary pulley 6 is performed.

At step S11, it is judged whether or not the target primary rotation speed Npri* is within the predetermined rotation speed range (N1≤Npri*≤N2). When the target primary rotation speed Npri* is within the predetermined rotation speed range, the process proceeds to step S5 to continue the line pressure increase control. Otherwise, the process proceeds to step s12.

At step S12, it is judged whether or not the vehicle speed VSP is within the predetermined vehicle speed range (VSP1≤VSP≤VSP2). When the vehicle speed VSP is within the predetermined opening degree range, the process proceeds to step S5 to continue the line pressure increase control. Otherwise, the process proceeds to step S13.

At step S13, the line pressure increase flag is set to the Off state. The process proceeds to step S14 to perform the normal line pressure control.

In this way, it is possible to exclude the influence of the oil vibration by increasing the line pressure in the traveling state in which it is conceivable to include the intersection points x1, x2, and x3, when the brake switch 17 is in the ON state, and when the line pressure is smaller than the predetermined pilot pressure. With this, it is possible to suppress the resonance with the tire rotation primary frequency and the natural frequency of the power train PT, and to maintain the stable engagement state.

Moreover, it proceeds to the normal line pressure control to allow the decrease of the line pressure when it is confirmed that it proceeds to the region other than the resonance region, when the brake switch 17 is brought to the OFF state while the line pressure increase control is performed in the ON state of the line pressure increase flag. In this way, even when the brake switch 17 is brought to the OFF state, the oil vibration may be generated again in the resonance region due to the decrease of the line pressure and so on. Accordingly, the line pressure increase control is continued. On the other hand, in a case where it is departed from the resonance region, the resonance is not generated. Accordingly, in this case, it is rapidly returned to the normal line pressure control. With this, it is possible to improve the fuel economy.

As described above, it is possible to attain following operations and effects in this embodiment.

(1) In the belt type continuously variable transmission mechanism CVT which includes a belt 7 wound around the primary pulley 5 and the secondary pulley 6, and which is shifted by controlling the pulley hydraulic pressures (the belt clamping forces) of the primary pulley 5 and the secondary pulley 6, there are provided:

the oil pump 3 and the pressure regulator valve 21 (line pressure generating means) arranged to generate the line pressure;

the pilot valve 25 arranged to supply the pilot pressure regulated so as not to exceed the first predetermined pressure when the line pressure exceeds the first predetermined pressure;

the control unit 10 (the control means) configured to generate the pulley hydraulic pressure by controlling the solenoid valve by the pilot pressure; and the step S4 and the step S5 (the line pressure increasing means) configured to increase the line pressure to be greater than the first predetermined pressure when the control to increase the line pressure is performed when the line pressure is lower than the first predetermined pressure.

In a case where the command to increase the hydraulic pressure is outputted when the line pressure is lower than the pilot pressure, the oil vibration may be generated in the line pressure due to the variation of the hydraulic pressure. In this case, in the first embodiment, the line pressure is controlled to be greater than the first predetermined pressure. Accordingly, even when the oil vibration is generated in the line pressure, the pilot valve 25 excludes the excessive hydraulic pressure varied based on the relationship between the feedback hydraulic pressure and the spring 250d. Consequently, it is possible to stably supply the first predetermined pressure. Therefore, it is possible to decrease the variations of the other hydraulic actuators according to the oil vibration since the other solenoid valves are controlled based on the stable pilot pressure. Accordingly, it is possible to prevent the mutual increase of the oil vibrations within the hydraulic circuit, and to suppress the unnatural feeling to the driver.

(2) There is provided the brake switch 17 (the brake operation sensing means) arranged to sense the depression of the brake pedal. The control unit 10 is configured to increase the line pressure to be greater than the first predetermined pressure when the brake switch 17 is brought to the ON state when the line pressure is lower than the first predetermined pressure.

Accordingly, it is possible to exclude the influence by the vibration of the line pressure, and to prevent the belt slippage.

(3) The control unit 10 is configured to perform the brake correction torque control to increase the clamping force of the pulley by increasing the line pressure in accordance with the deceleration of the vehicle when the depression of the brake pedal is sensed, and to increase the line pressure to be greater than the first predetermined pressure when the line pressure which is increased by the brake correction torque control is lower than the first predetermined pressure.

When the brake correction torque control is performed, the clamping forces are increased by increasing the line pressure in accordance with the deceleration of the vehicle, for preventing the belt slippage. In this case, in a case where the clamping forces are increased in the range lower than the first predetermined pressure, the pilot pressure is vibrated when the oil vibration is generated. With this, the oil vibration is influenced on the clamping forces to provide the unnatural feeling to the driver. On the other hand, in the first embodiment, the line pressure is increased to be greater than the first predetermined pressure, irrespective of the increase of the line pressure by the brake correction torque control. Accordingly, when the oil vibration is generated in the line pressure, it is possible to ensure the stable pilot pressure. Consequently, it is possible to prevent the mutual increase of the oil vibration within the hydraulic circuit, and to suppress the unnatural feeling to the driver.

(4) The control unit 10 is configured to increase the line pressure to be greater than the first predetermined pressure when the line pressure set in accordance with the traveling state is equal to or smaller than the first predetermined pressure when the brake switch 17 is the ON state at the point x2 of intersection (the first traveling state) at which the tire rotation primary frequency and the oil vibration frequency corresponds to each other.

Accordingly, in the brake correction torque control, the line pressure becomes greater than the first predetermined pressure in the first traveling state in which the tire rotation primary frequency and the oil vibration frequency corresponds to each other even when the line pressure is lower than the first predetermined pressure, and the pilot pressure is identical to the line pressure. Consequently, it is possible to increase the line pressure to be greater than the pilot pressure. Therefore, even when the oil vibration is generated in the line pressure, it is possible to decrease the influence on the pilot pressure, to decrease the elements vibrated within the control valve, and to suppress the increase of the oil vibration due the mutual interference. With this, even when the rotation primary frequency of the tire and the oil vibration frequency of the control valve correspond to each other, it is possible to suppress the resonance between the oil vibration frequency and the tire primary frequency. Accordingly, it is possible to stably perform the brake correction torque control, and to suppress the unnatural feeling according to the behavior variation of the vehicle to the driver.

(5) The control unit 10 is configured to increase the line pressure to be greater than the first predetermined pressure when the line pressure is equal to or smaller than the first predetermined pressure when the brake switch 17 is in the ON state at the point x1 of intersection (the second traveling state) at which the oil vibration frequency of the line pressure and the natural frequency of the power train PT (the torsion natural frequency between the continuously variable transmission and the tires.

Accordingly, even when the oil vibration is generated in the line pressure due to the increase of the line pressure according to the brake correction torque control, it is possible to stably supply the first predetermined pressure without the influence on the pilot pressure. Consequently, it is possible to suppress the resonance with the natural frequency of the power train PT. Therefore, it is possible to stably perform the brake correction torque control, and to suppress the unnatural feeling according to the variation and so on of the forward/rearward acceleration to the driver.

(6) The control unit 10 is configured to increase the line pressure to be greater than the predetermined pressure when the line pressure is equal to or greater than the first predetermined pressure when the brake switch is in the ON state at the point x3 of the intersection (the third traveling state) at which the rotation primary frequency of the tire and the natural frequency of the power train PT corresponds to each other.

Accordingly, even when oil vibration is generated in the line pressure by the increase of the line pressure according to the brake correction control, it is possible to stably maintain the engagement state of the lock-up clutch 2a without the influence on the pilot pressure. Consequently, even when the resonance of the primary rotation frequency of the tire and the natural frequency of the power train PT are generated, it is possible to suppress the resonance of that resonance and the oil vibration frequency. Therefore, it is possible to stably perform the brake correction torque control, and to suppress the unnatural feeling according to the variation and so on of the forward/rearward acceleration to the driver.

(7) The control unit 10 is configured to increase the line pressure to be greater than the first predetermined pressure when the line pressure is smaller than the first predetermined pressure when the brake switch 17 is the ON state, and when the target primary rotation speed Npri* is within the predetermined rotation speed range including the point x2 of the intersection.

Accordingly, it is possible to specify the traveling state by the simple structure. Besides, it is optional to specify the traveling state by the points of the intersections x1 and x3, and also the points of the intersection x4 and x5, in addition to the point of the intersection x2.

(8) The control unit 10 is configured to increase the line pressure to be greater than the first predetermined pressure when the line pressure is equal to or smaller than the first predetermined pressure when the brake switch is in the ON state, and when the vehicle speed VSP is within the predetermined vehicle speed range including the point x2 of the intersection.

Accordingly, it is possible to specify the traveling state by the simple structure. Besides, it is optional to specify the traveling state by the points of the intersections x1 and x3, and also the points of the intersection x4 and x5, in addition to the point of the intersection x2.

(9) The control unit 10 is configured to finish the line pressure increase control when the line pressure is increased, when the brake switch 17 is in the OFF state, and when the target primary rotation speed Npri* is out of the range defined by N1 and N2 (out of the predetermined rotation speed range).

Even when the brake switch 17 is in the OFF state, and when the brake correction torque control is finished, the oil vibration may be caused in the resonance region in accordance with the decrease of the line pressure. Accordingly, the line pressure increase control is continued in the resonance region. With this, it is possible to suppress the unnatural feeling to the driver. Moreover, when it is out of the resonance region, it is possible to decrease the line pressure while avoiding the generation of the resonance. Consequently, it is possible to improve the fuel consumption without providing the unnatural feeling to the driver.

(10) The control unit is configured to finish the line pressure increase control when the line pressure is increased, when the brake switch 17 is in the OFF state, and when the vehicle speed VSP is out of the range defined by VSP1 and VSP2 (out of the predetermined vehicle speed range).

Even when the brake switch 17 is in the OFF state, and when the brake correction torque control is finished, the oil vibration may be caused in the resonance region in accordance with the decrease of the line pressure. Accordingly, the line pressure increase control is continued in the resonance region. With this, it is possible to suppress the unnatural feeling to the driver. Moreover, when it is out of the resonance region, it is possible to decrease the line pressure while avoiding the generation of the resonance, by the end of the line pressure increase control. Consequently, it is possible to improve the fuel consumption without providing the unnatural feeling to the driver.

Hereinbefore, the present invention has been illustrated based on the embodiment. The present invention includes the other structures. For example, in the first embodiment, the regions of the target primary rotation speed Npri* and the vehicle speed VSP are the regions including the points of the intersections x1, x2, and x3. However, a region including at least x1 may be defined. A region including x1 and x2 may be defined.

Moreover, in the first embodiment, when the resonance region is specified, the line pressure increase control is performed when both of the condition of the target primary rotation speed Npri* and the condition of the vehicle speed VSP are satisfied. However, the line pressure increase control is performed when one of these conditions is satisfied. Furthermore, when it is shifted from the line pressure increase control to the normal line pressure control, it is shifted to the normal line pressure control when the both of the condition of the target primary rotation speed Npri* and the condition of the vehicle speed VSP are not satisfied. However, when one of these conditions is satisfied, it may be shifted to the normal lie pressure control.

Moreover, in the first embodiment, when the resonance region is specified, it is judged by using the target primary rotation speed Npri*. However, it is not limited to the target primary rotation speed Npri*. It is judged by using the actual primary rotation speed Npri.

Furthermore, at step S4 in the first embodiment, the line pressure and the first predetermined pressure are compared. However, the target line pressure when the brake correction torque control is performed and the first predetermined pressure may be compared. That is, in a case where the brake correction torque control to increase the secondary pulley pressure when the brake switch 17 is in the ON state, the line pressure increase may be performed when the line pressure increased by that brake correction torque control does not reach the first predetermined pressure. With this, it is possible to further exclude the influence of the oil vibration on the pilot pressure, and to improve the energy consumption without the excessive increase of the line pressure.

Furthermore, in the first embodiment, the line pressure increase control is performed in the resonance region. However, the line pressure increase control may be performed simply based on the shift of the brake switch 17 to the ON state.

The invention claimed is:

1. A control device for a continuously variable transmission which includes a belt wound around a primary pulley and a secondary pulley, and which is shifted by controlling a belt clamping force of the primary pulley and of the secondary pulley, the control device comprising:
   an oil pump and a pressure regulator valve configured to generate a line pressure;
   a pilot valve configured to supply a pilot pressure regulated so as not to exceed a first predetermined pressure when the line pressure exceeds the first predetermined pressure; and
   a control unit to control the continuously variable transmission, the control unit being configured to
   generate the clamping force by controlling the pilot pressure; and
   increase the line pressure to be greater than the first predetermined pressure when a control to increase the line pressure is performed when the line pressure is lower than the first predetermined pressure.

2. The control device for the continuously variable transmission as claimed in claim 1, wherein:
   the control device further comprises a brake switch arranged to sense a depression of a brake pedal; and
   the control unit is further configured to increase the line pressure to be greater than the first predetermined pressure to increase the clamping force of at least one pulley of the primary and secondary pulleys when the depression of the brake pedal is sensed when the line pressure is lower than the first predetermined pressure.

3. The control device for the continuously variable transmission as claimed in claim 2, wherein the control unit is further configured to perform a brake correction torque control to increase the clamping force of the at least one pulley by increasing the line pressure in accordance with a deceleration of the vehicle when the depression of the brake pedal is sensed, and to increase the line pressure to be greater than the first predetermined pressure when the line pressure increased by the brake correction torque control is lower than the first predetermined pressure.

4. The control device for the continuously variable transmission as claimed in claim 2, wherein the control unit is further configured to increase the line pressure to be greater than the first predetermined pressure when the line pressure set according to a traveling state is equal to or smaller than the first predetermined pressure when the brake pedal is depressed in a first traveling state where a tire rotation primary frequency and an oil vibration frequency correspond to each other.

5. The control device for the continuously variable transmission as claimed in claim 4, wherein the control unit is further configured to increase the line pressure to be greater than the first predetermined pressure when the line pressure is smaller than the first predetermined pressure when the brake pedal is depressed in a state where a second traveling state where torsion natural frequencies between the continuously variable transmission and a tire correspond to each other.

6. The control device for the continuously variable transmission as claimed in claim 5, wherein the control unit is further configured to increase the line pressure to be greater than the first predetermined pressure when the line pressure is equal to or smaller than the first predetermined pressure when the brake pedal is depressed in a third traveling state where torsion natural frequencies between the continuously variable transmission and the tire correspond to each other.

7. The control device for the continuously variable transmission as claimed in claim 4, wherein the control unit is further configured to increase the line pressure to be greater than the first predetermined pressure when the line pressure is equal to or smaller than the first predetermined pressure when the brake pedal is depressed, and when a primary rotation speed is within a predetermined rotation speed range including the first traveling state.

8. The control device for the continuously variable transmission as claimed in claim 4, wherein the control unit is further configured to increase the line pressure to be greater than the first predetermined pressure when the line pressure is equal to or smaller than the first predetermined pressure when the brake pedal is depressed, and when a vehicle speed is within a predetermined vehicle speed range including the first traveling state.

9. The control device for the continuously variable transmission as claimed in claim 7, wherein the control unit is further configured to return the line pressure to the hydraulic pressure set in accordance with the traveling state when the brake pedal is not depressed and when the primary rotation speed is not within a predetermined rotation speed range when the line pressure is increased.

10. The control device for the continuously variable transmission as claimed in claim 8, wherein the control unit is further configured to return the line pressure to the hydraulic pressure set in accordance with the traveling state when the brake pedal is not depressed and when the vehicle speed is not within the predetermined vehicle speed range when the line pressure is increased.

* * * * *